United States Patent [19]
Mellish et al.

[11] Patent Number: 5,953,226
[45] Date of Patent: *Sep. 14, 1999

[54] CONTROL SYSTEM HAVING AN APPLICATION FUNCTION WITH INTEGRATED SELF DIAGNOSTICS

[75] Inventors: Michael Thomas Mellish, Raleigh; Mac Haley, Youngsville, both of N.C.

[73] Assignee: Square D Company, Palatine, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/760,792

[22] Filed: Dec. 5, 1996

[51] Int. Cl.$^6$ ...................................................... G05B 11/01
[52] U.S. Cl. .......................... 364/147; 364/146; 364/186; 364/187; 364/188
[58] Field of Search ...................................... 364/130, 138, 364/140, 147, 188, 191, 139, 141, 146, 184, 186, 187, 148.04, 148.05, 148.02, 140.04, 140.06; 395/700, 800, 955, 919, 921, 922; 706/10, 47, 908, 916, 45, 60

[56] References Cited

U.S. PATENT DOCUMENTS

| | | | |
|---|---|---|---|
| 4,500,951 | 2/1985 | Sugimoto et al. | 364/186 |
| 4,898,263 | 2/1990 | Manske et al. | 187/133 |
| 5,276,619 | 1/1994 | Ohara et al. | 364/424.04 |
| 5,485,620 | 1/1996 | Sadre et al. | 395/700 |
| 5,511,211 | 4/1996 | Akao et al. | 395/800 |

*Primary Examiner*—William Grant
*Assistant Examiner*—Ramesh Patel
*Attorney, Agent, or Firm*—Michael J. Femal; Larry I. Golden

[57] ABSTRACT

A self diagnostic system is integrated into an application program for controlling a machine or process. The application program is comprised of various logical segments that have to be solved by a logic solving engine. The diagnostic program will annunciate an event when the application program cannot execute a desired response by monitoring certain preselected and marked segments of the application program and allocating memory to save the result. When an abnormal occurrence in these segments results in the desired event not occurring, the diagnostic system will determine what part of the logic expression controlling the event could not be completed. This information will be saved and used for annunciating the reason for the desired event not happening. The diagnostic system includes a special control module that is added to the application program. This module is implemented as either an instruction added to the marked logic segment that is to be monitored in the case of a ladder logic system or as a subroutine as part of other types of sequential control methods. The data is recorded automatically, without application programming.

12 Claims, 4 Drawing Sheets

CONTROL SYSTEM HAVING AN APPLICATION FUNCTION WITH INTEGRATED SELF DIAGNOSTICS

TECHNICAL FIELD

Applicants' invention relates generally to the fields of machine and process control systems and more particularly to a self diagnostic system integrated into the control system for reporting and detecting a condition that caused a requested action not to be completed.

BACKGROUND ART

In machine control and process control systems, diagnostics is the ability of the control system to annunciate the root cause which makes the control system move from its programmed sequence of operation, to a non-standard sequence state. The control system must be able to filter out the expected side effects of this departure from standard operating sequence, from additional and significant new problems. For example if the departure were caused by a high discharge pressure on a pump, resulting in halting the pump, subsequent low flow and potentially low discharge pressure alarms would be triggered. These are normal side effects, not additional process faults. However, if the loss of coolant flow results in an excessive tool temperature which might require maintenance personnel to inspect the tooling prior to attempting a restart, the operator needs to become aware of the situation for corrective action.

Diagnostic systems presently in use are generally considered inadequate for various reasons. The logic to monitor the sequence control system generally represents almost twice the logic as the sequence itself. As the control logic gets modified during its lifetime, the diagnostic logic rarely keeps up, and within six months of startup, only the most critical conditions may remain in the diagnostic system. The diagnostic code also adds to the complexity of maintaining the sequence control program in general, due to the huge volume of extra code it adds to the system and the extra steps that have to be scanned.

Early attempted cures to this problem included a sequence monitoring system that monitored a range of inputs and outputs for state change versus time, and stored the information away. It could then detect a out of sequence operation, excess time in a step, etc., and provide this output to a man-machine interface (MMI) device for action by maintenance personnel. When first installed on a machine tool, this capability to diagnose state transitions versus time operated with a reasonable degree of accuracy. However, over time the machine's ability to have a growing variability in exact order of operation of the individual motions that make up the machines operation, caused the diagnostic system to create spurious faults. The allowable time in sequence order was broadened to reduce the spurious faults, but this merely made the number of real faults detectable dramatically smaller. Breaking up the machine sequence into smaller sets of monitored sequences offered some improvement, but made the programming of diagnostics beyond the reach of most original equipment manufactures OEM's, and insupportable by the maintenance staffs of most end users.

A ladder logic programming technique was created that required the user to program the machine sequence in a fixed structure which allowed the control and diagnostic logic to be grouped in such a way that reasonably predictable diagnostics resulted. This solution was widely adopted in systems where standard logic sequences were directly tied to tooling designs created from computer aided design CAD workstations. In machine control, where logic is generally created from scratch to meet each application, it generally did not catch on. It had difficulty in complex machine applications, and generally required a software discipline which was not maintainable at the customer installation.

The next wave of diagnostic systems were based on external computer systems operating in parallel with the programmable logic controllers PLC running the machine sequence. In this area, the external systems were generally based on standard microcomputers and eventually PCs, and fell into one of two categories: expert systems based on learned knowledge, and programmed systems which basically removed the complex ladder diagnostic program and ran the equivalent of that software on the external computer. Expert systems monitored the machine, and linked the fact that the machine halted to a prior case when something similar happened. Since the end state of the machine data was not necessarily indicative as the problem, much false information was generated. Likewise the ability to capture the true cause of the change of sequence proved beyond a knowledge system. One exception to this was a system in which acoustic sensors were used to check assembled engines, transmissions and axles. The system generated a digital profile of the acoustic pattern, and compared this to other known good samples. In the event that the sound profile indicated a problem, the unit could be torn down until the specific problem was identified, and logged into the knowledge base. Thereafter it could always detect that problem. However, it did not have the ability to monitor machine sequences. In parallel programmed systems, the parallel system has to remain synchronized with the control sequence program. Over time, the synchronization may be lost and the diagnostics will fall apart because they may not maintained properly.

Another solution to machine diagnostics was the development of State Logic. The user created an integrated control and diagnostic program, combined with standard system tools to ease the diagnostic programming burden. This was not very successful since state logic products failed to become a mainstream solution to programming machine control. Users valued the comfort of ladder logic over diagnostics created by text based programs, and preferred something which would improve ladder logic, not eliminate it.

To meet the requirements for machine diagnostics and process validation in machine and process control systems, there is a need for a diagnostic system that is integrated into the main programming language and solved by the system logic solver. The diagnostic system should not be a part of an extension created in an auxiliary processor or program.

SUMMARY OF THE INVENTION

Accordingly, the principal object of the present invention is to provide a diagnostic system in a control system having an application program for annunciating an event when the application program cannot execute a desired response.

A further objective of the invention is to provide the diagnostic program within the application program itself.

Yet a further objective of the invention is to provide a method for modifying the application program to retain information which is created during execution of the program but not normally saved or enunciated. Further, the application program can be modified without having to modify the diagnostic system.

In the preferred embodiment of the invention, the invention is comprised of a system of essential elements including, but not limited to, an application program for controlling a machine or process, a logic solving engine to run the application program, and a diagnostic system for monitoring certain preselected and marked segments of the application program. When an abnormal occurrence in these segments results in the desired event not occurring, the diagnostic system will determine what part of the logic expression controlling the event could not be completed. This information will be saved annunciating use for annunciating the reason for the desired event not happening.

The diagnostic system includes a special control module that is added to the application program. This module is implemented as either an instruction added to the logic segment that is to be monitored in the case of a ladder logic system or as a subroutine as part of other types of sequential control methods, such as sequential function charts (SFC). Either method requires that the rung in the ladder logic or section of logic be marked to indicate that it is monitored and allocating memory to save the result. This enables the application program to be easily modified without having to change the diagnostic system. The data is recorded automatically, without application programming. This data includes actions, the expected reactions, and annunciation of the problem if the action cannot be completed. The host application will then decode the sequence for determining what data to provide operations and maintenance personnel as to what went wrong.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
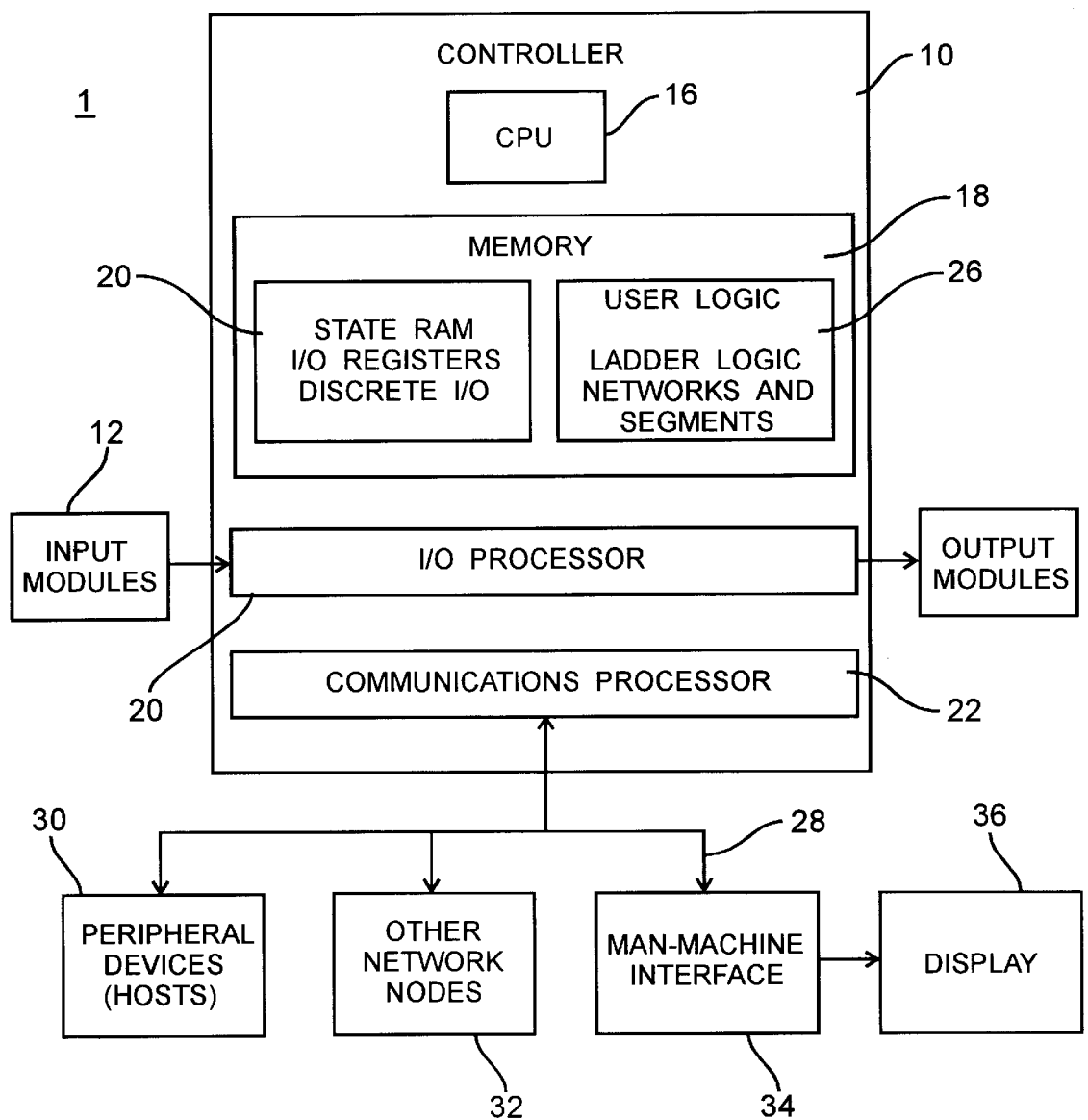
FIG. 1 is a block diagram showing a typical controller adaptable for use with the present invention.

FIG. 1 illustrates a control system 1 consisting of a controller 10, input modules 12 and output modules 14. The input modules 12 are sensing devices utilized in the control system. These could be digital signals from on-off devices, such as switches, valves, and interlocks, or analog signals representative of temperature, pressure, and voltage. The output modules 14 could be motor starters, indicating lamps, relays, and so on. A central processing unit CPU section 16 solves a user logic program resident in a memory 18 for controlling the control system. Memory 18 stores the user logic program, input/output (I/O) tables, executive firmware, and other system overhead elements. It has at least two sections, a state random access memory RAM 20 and a user logic section 22. The state random access memory RAM 20 contains I/O registers for storing data associated with the input and output devices, including values and discrete registers for storing status of the input modules 12 and for controlling the output modules 14. An I/O processor 24 directs the flow of signals from the input modules 12 to the state memory 20 and provides a path over which the output signals resulting from the CPU 16 logic solutions are sent to the output modules 14. The CPU solves the user program, which is typically a ladder logic program stored in the user logic section 22, based on the current values in the input tables in the state RAM 20. The results are stored in the output tables and are used to drive the output devices. A communications processor 26 provides an interface to a network 28. This interface allows the controller 10 to communicate with other peripheral devices 30, other nodes or controllers 32 on the network, and a man-machine interface (MMI) 34 which can be used to provide a visual display of the complete system or be used to program the individual controllers of the overall control system or process.

Figure 2:
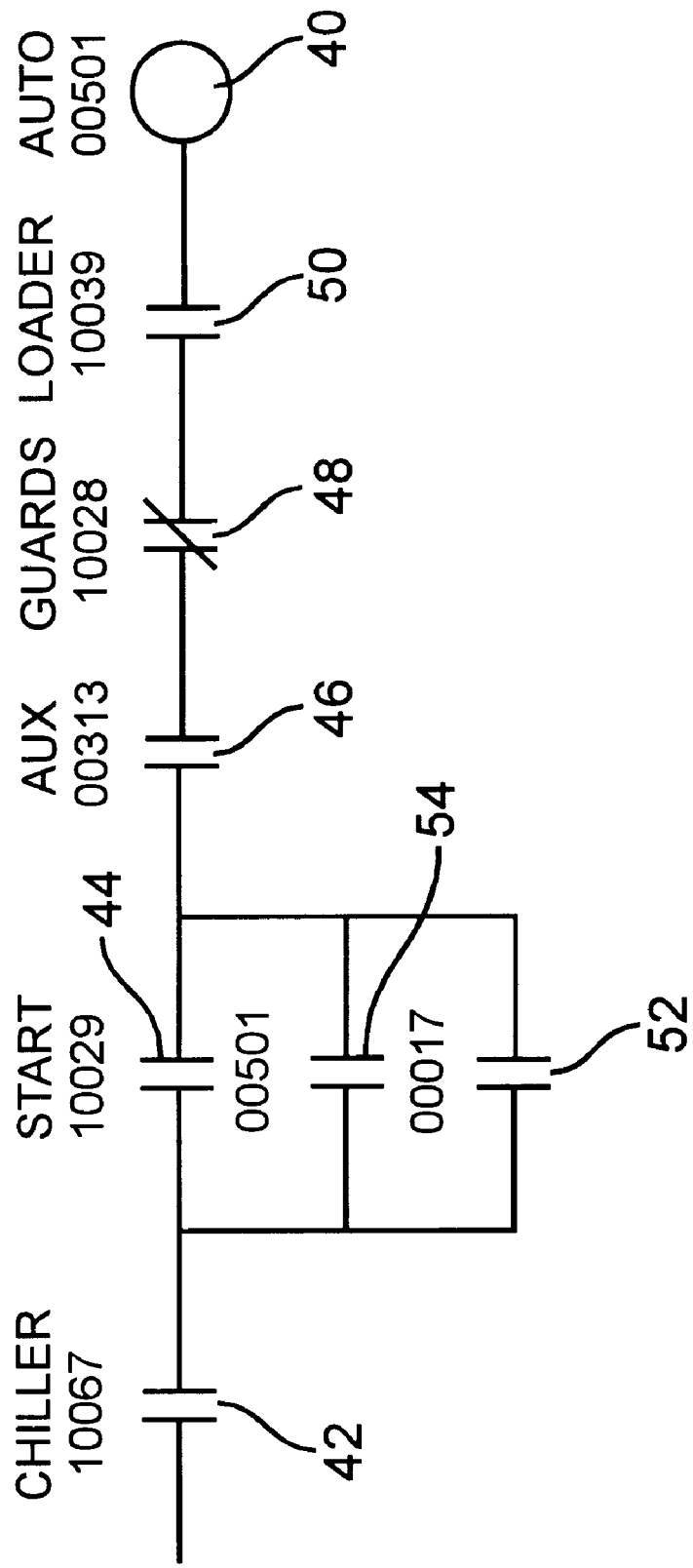
FIG. 2 is a ladder logic diagram showing a typical machine control circuit.

All of the ladder logic required to control a process or system is stored in a logic segment in the user logic memory section 22. A segment is composed of a group of contiguous logic which are small clearly defined logic programs having interconnected rungs and columns. The intersection of each rung in the network is a node. The size of the segment is limited by the memory available in the CPU and by the time it takes the CPU to scan the ladder logic program. In constructing a rung in the program, the user starts from the left and fills each node with an element such as a contact, a short, or a function block that will cause a coil, that occupies the last node of the rung, to be either on or off, depending on the state of the elements. As an example, FIG. 2 illustrates a typical control rung that may be used to switch a process or machine into an automatic mode of operation. The five digit numbers are used to indicate a memory location for each of the elements. In this case, the Auto mode is represented by coil 40. It will be able to be energized when all the conditions represented by contacts 42, 44, 46, 48, and 50 are met. A chiller has a contact 42 that is closed when it is operating. Some auxiliary circuits associated with the process have to be completed and will cause contact 46 to close. Interlocks and guards have to be inplace, otherwise contact 48 will be open. Likewise, an automatic part loader used in the process has to be active or energized to allow contact 50 to close.

Figure 3:
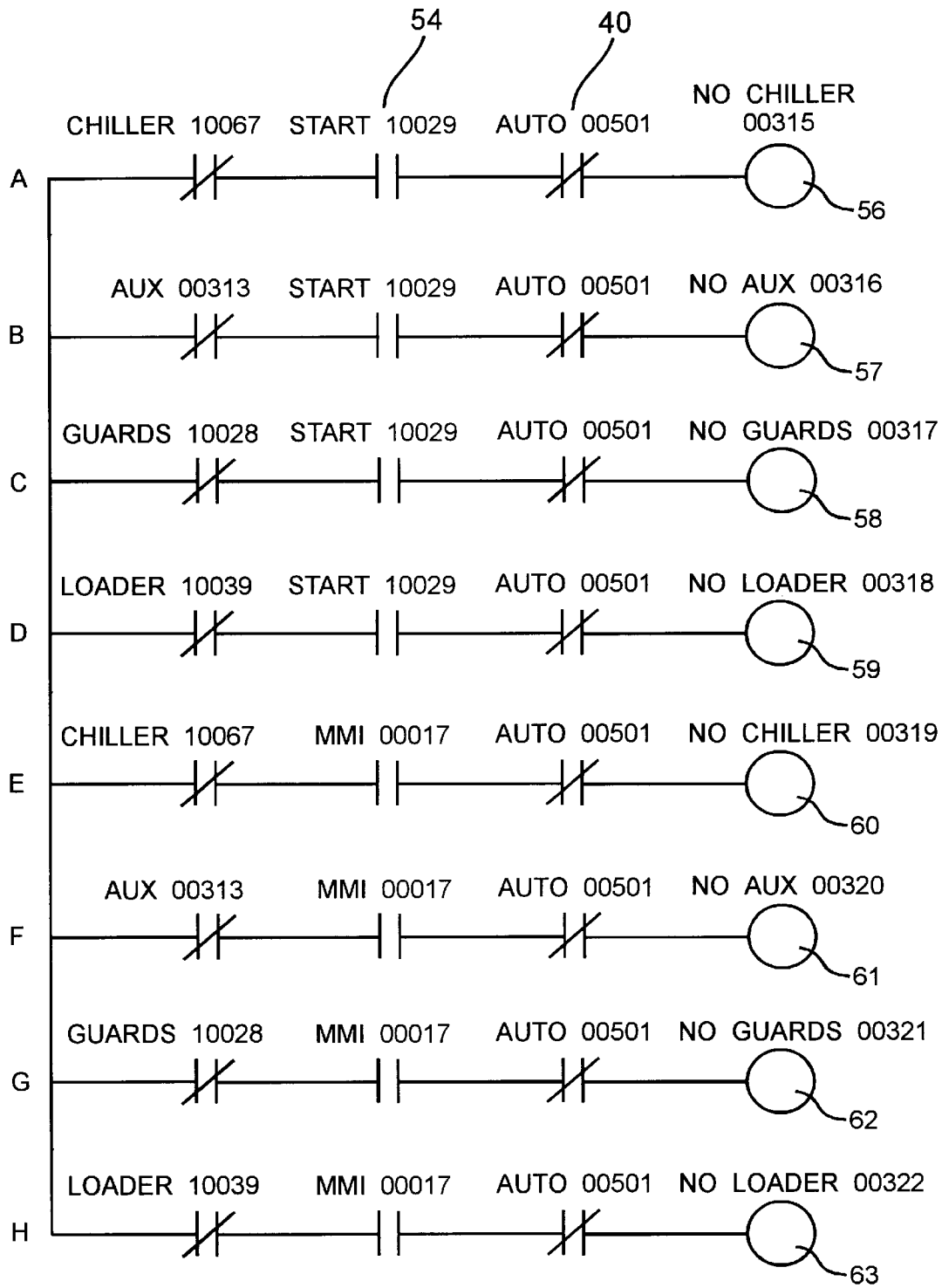
FIG. 3 is a ladder logic diagram showing the required steps required to self diagnose the machine control circuit of FIG. 2 according to the prior art.

The control system must then determine if the operation is safe to perform, be allowed to be performed with the machine in its current state, and then attempt to complete the request. For example, an operator might request the system to enter Auto by pressing the start push button 44, or through a remote contact 52 from a MMI controller. If all conditions are met per the ladder logic rung, the coil 40 will energize and its corresponding contact 54 will latch the coil on. However, if the automatic part loader is locked in manual, the control system will be prevented from accomplishing this task. In such a case, if an operator presses the start button, it will result in no activity, and also no feedback to the operator as to why the operation was not performed. In conventional systems this is a major undertaking since the logic necessary to diagnose the problem within the machine which prevents operation of the command within the control program is always larger and more complex than the original control program. The user must reconstruct each possible problem represented by the control program as a series of programmed checks for that problem, as illustrated in FIG. 3. If the Auto coil 40 does not turn on when start 44 or remote 52 is closed, to determine which contact 42, 46, 48, or 50 caused the problem, the user has to add eight additional rungs of ladder logic to monitor the single rung to test it. Thus rung A monitors the chiller 42 and will cause coil 56 to energize if the chiller is not on, the MMI start request 52 has occurred and the auto coil 40 did not energize. Coil 56 could then trigger an error message or enunciate the problem. In a similar manner, coils 57–63 will energize if any of the other monitored conditions are not met. For simple systems, this may be adequate. For more complex control systems, any changes to the core sequence invariably have a major effect on the number of lines of code which must be changed to support seemingly minor edits. Invariably, the control program which handles the operator input, and the diagnostic program which investigates why the operation cannot be performed will drift apart until the diagnostic system is a nuisance and no longer of interest. Changing the rung in FIG. 2 would require the user to remember to also edit the additional rungs of logic and to create additional monitoring rungs.

A separate coprocessor could be utilized to monitor the various inputs and control sequences. The user programs all operator functions as a range of consecutive bits in a buffer memory of the controller. The co-processor monitors the buffer for changes of state which would indicate an operator command. It could then search through a text file which described an Action/Reaction expected from that change. Each event should trigger a specific coil or Boolean bit. If the reaction bit is "ON" or a 1 state, the reaction is completed and the request is completed. If the reaction bit is "OFF" or a zero state, the requested action is not complete, and the program has to determine what event is preventing the reaction from being completed.

Figure 4:
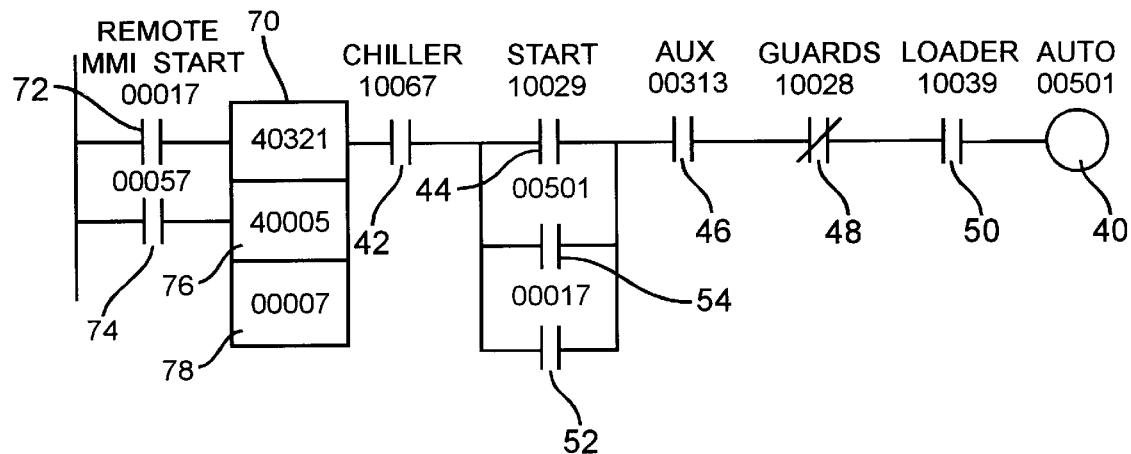
FIG. 4 is a ladder logic diagram showing the typical machine control circuit of FIG. 2 constructed according to the present invention.

The present invention adds this functionality within the controller 10 without the need of a co-processor and makes the monitoring more automatic. The step that is automated adds the ability to check the control logic of a rung marked as an Action/Reaction event and records the problem without user programming to compare all of the logical alternatives of the rung. This is shown in the preferred embodiment in FIG. 4. The user marks a rung of ladder logic as an Action/Reaction rung. This is accomplished by adding an instruction mark 70 to the ladder diagram. This instruction has two inputs, 72, 74 and two outputs, 76, 78. The first input is a reference input which indicates that an action had been commanded. This triggers the instruction block 70 to perform a check of all logic connected to the right of that rung. In FIG. 4, coil 17 turning-on, in the form of contact 72, would indicate an externally commanded event, received from a MMI controller or similar device, is attempting to turn on the auto cycle coil 40.

Figure 5:
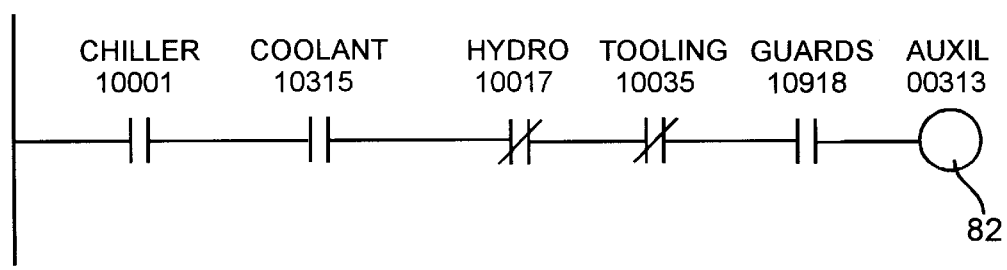
FIG. 5 is a ladder logic diagram showing an auxiliary ladder rung of the typical machine control circuit of FIG. 2.

The second input 74 is a trace level input value, to indicate that some of the contacts in the interlocked rung were references to still other coils. If closed, input 74 would allow the function block 70 to trace back to other logic rungs associated with the contact 46 to get to root cause of the problem. FIG. 5 illustrates a series of interlocks that control an auxiliary coil 82, which indicates, when energized, that the auxiliary equipment is operational. The trace function will reveal which specific piece is not operational. Trace will continue backwards until a discrete input reference is found as the root cause, or a fixed number of trace levels have been executed. However, it might be necessary to limit the number of trace levels which can be utilized to prevent excessive looping through logic in more complex systems.

The first output 76 will always be an on state to pass logic control through the block 70 to the rung at all times. The second output 78 will be a done/error flag, which could be a 32 bit unsigned integer value indicating either done, meaning that the ladder logic is correctly in place, or a reference number of the offending condition. There could also optionally be a string output that can directly drive an error message of up to a limited number of characters, usually 64.

The block 70 has three programmed elements or nodes which define where the data created by solving the logic will be stored. This data includes the action flag which triggers the event, the reaction coil which responds to the action, and the result of the action. In FIG. 4, the action could be the remote start contact 72 closing with the expected reaction being the energization of the AUTO coil 40. If the coil 40 did energize, a done message is stored, but if it failed to do so, the potential problem or problems that prevented energization would be stored instead. This information will contain a reference number of the problem, the node type of the problem and the incorrect state of the problem element. The node type could be any number of devices, including hard contacts from switches, relays, and timers, transistional contacts, counters, short circuit representations, and function blocks for value comparisons. In the case of timers and counters, the error data can indicate a preset value and an accumulated value.

The instruction block 70 becomes the second instruction of any monitored rung, with the ordinary control logic programmed immediately to the right of the top output 76. When triggered by start 72, the block 70 scans the logic of that rung to find the first logic element which prevented the coil from turning on, and then presents that value to the error flag 78. If there is no error and the coil 40 turns on, a done flag would be loaded to the error flag 78. In this way the instruction block 70 allows all of the logic to the right of the block to be maintained as the normal control program, without ever a need to update the instruction block 70 since it will actually scan the logic on its own. Adding more contacts, branch circuits etc. will not become a problem in keeping the diagnostics constant. Even changing the output coil would not matter to the instruction block 70.

To output prompts, the user has several options. It could output a message number which was the address of the offending element, which a message display could use to point to messages within its own memory, or it could directly output a string message. Ideally the messages used are the program descriptors for each input and output programmed in the user logic program or the message number could trigger a message via an alarm handler in one of the devices connected to the network 28. The preferred option is one that will maintain its output automatically.

To implement the instruction block 70, the block could be written in a "C" instruction. In this implementation, the block could directly read the memory of the network in which it was programmed, and determine if the coil would turn on, and if not, which contact, in order usually from left to right, was the problem, and save that data to holding registers in the user memory 18. The normal ladder logic solving process would then commence, essentially duplicating the scan of the network just completed by the instruction block 70. A second implementation would create the instruction block 70. However the execution would be based on modification of the logic solver. In this case a marker is placed in memory to tell the logic solver which network is being monitored by the external programming device. When that network is solved, the system saves data representing the logical 0 or 1 state at every vertical column of the ladder logic network. This is required to ensure that the representation on the programmer actually looks the way the logic was solved by the controller's CPU when it processed that rung. A marker is used to indicate which rung or rungs are to be monitored, and where the resulting data is placed. Many rungs could be monitored during a single scan of the ladder logic program, so each monitored rung must have associated with the rung, memory to store the diagnostic result. The logic solver would then be modified to detect the instruction block 70 and proceed to solve the rung to the point of completion or the first break, at which point it would write the data back to the parameters associated with the block.

A third implementation builds the monitoring of a rung or group of rungs into the section definition, eliminating any obvious user logic program. This could be a graphic representation of the action as a contact and a coil representation for the coil which is supposed to be the reaction to the request.

A PC based task collects data from the block 70 and dynamically builds the message from the data supplied. The block 70 supplies the information about the logic function or functions that blocked the action, with associated reference numbers, and the value of the offending logic elements. From there, the PC task, which could be written in a number of programming languages, such as "C", extracts a tag name and description from the database and combines it with the appropriate logic reconstruction to state the problem.

The error message format becomes a series of fixed strings with data fields filled in by the logical reconstruction of the problem. As one example, referring back to FIG. 4, the instruction block 70 would be programmed with normally open contacts from the manual and remote start switches 44, 72 wired in series to indicate that an attempt has been made to initiate an action, which triggers the block 70 to go into action. The output of the block 70 defines the specific action that triggered the event, either contact 44 or 52, the reaction, which is Auto coil 40 which is to be triggered by the network logic, and the resultant state of the coil 40. Using a message format of:

<action name><action reference #><action PLC description>Request<result> the message would read:

Auto Start <10029><Auto Push Button> Request Done if the coil 40 becomes energized. If the coil did not energize, using a message format of:

<action name><action reference #><action PLC description>Request Can't Do Because <problem name><problem reference #><problem PLC description> is <value> should be <value desired> the message would take a different form, if for instance the chiller contact 42 was not closed:

<Auto Start><10029><Auto Push Button>Request Can't Do Because <chiller><10067><ON indicates Chiller on Line> is <OFF/O> should be <ON/1>

The "should be state" is based on understanding the programmed logic. Since chiller input contact 42 is programmed as a normally open contact, the expected state is on. If the contact were normally closed, the expected state would be off. The error messages can be tailored to specific application to cover parallel contacts, timer and counter value problems, value comparison problems and so on.

While the specific embodiments have been illustrated and described, numerous modifications are possible without departing from the scope or spirit of the invention. The implementation of the instruction block 70 need not be restricted to ladder logic. There is no reason that the present invention cannot be extended to other types of logic solving engines such as instruction lists, function blocks, and structured texts, The self diagnostic checking logic can apply to database programs, spreadsheets, or other PC based tools. In addition to process or other types of machine control systems, the concept of the instruction block 70 could be applied to variable frequency drives, servo drives, solid state motor controls, PC based control, and Supervisory Control and Data Acquisition (SCADA) systems.

We claim:

1. A self diagnostic control system comprising:

A. a processor;

B. a memory;

C. an application program stored in said memory run by the processor for controlling output devices in response to a status of a plurality of input devices, the application program including a plurality of logical segments for controlling the output devices, each of said logical segments requiring selected input and output devices to be in a predetermined state before an output device controlled by the logical segment can reach an expected state;

D. a diagnostic program integral to the application program for annunciating an event when the application program cannot execute a desired response, said diagnostic program for monitoring certain preselected and marked logical segments of the application program and allocating memory to save data of the event;

E. a function block integral to selected ones of said logical segments, said function block for use in determining which of selected input and output devices in the selected logical segments prevented the output device from reaching the expected state; and F. wherein the diagnostic program saves the data of the event automatically, without application programming.

2. The self diagnostic control system of claim 1 wherein each of said logical statements consists of series connected logical elements coupled to an output representation, each element requiring a predetermined state to energize the output representation, and wherein said series connected elements are coupled between said output representation and the function block in each selected logical segment.

3. The self diagnostic control system of claim 2 wherein the function block in each selected logical segment has at least one input and two outputs, said input for initiating an action to energize the output representation, a first output to pass logic control to the series connected logical elements and second output to indicate the result of the initiating action.

4. The self diagnostic control system of claim 3 wherein the second output of the function block in each selected logical segment will set a flag if the action was completed and will provide a separate indication if it was unable to complete the action, the second indication including a reference to the element that prevented the output representation from reaching its expected state.

5. The self diagnostic control system of claim 4 wherein said second output is stored in said memory and is accessible to other parts of said application program for use by alarm handlers, annunciators, displays, and other external devices coupled to the control system.

6. The self diagnostic control system of claim 4 wherein the second indication further includes means for adding character strings to identify other pertinent data to a particular operation, including reasons as to why a particular selected logical element failed.

7. The self diagnostic control system of claim 3 wherein a second input to the function block in each selected logical segment provides a means to allow the function block to trace back to another selected logical segment if a particular selected logical element is related to the other selected logical segment and failed due to other elements in that segment.

8. A self diagnostic program having a function block for a control system having a processor and an application program stored in a memory run by the processor for controlling output devices in response to a status of a plurality of input devices, the application program including a plurality of logical segments for controlling the output devices, each of said logical segments requiring selected input and output devices to be in a predetermined state before an output device controlled by the logical segment can reach an expected state, each of said logical statements consisting of series connected logical elements coupled to an output representation, each element requiring a predetermined state to energize the output representation, said function block comprising:

A. a first input for initiating an action to energize an output representation;

B. a first output to pass logic control to the series connected logical elements that are controlling the output representation;

C. a second output to indicate the result of the initiating action;

D. means for determining which of the series connected logical elements failed to reach its predetermined state and prevented the output representation reaching its expected state during an event occurrence;

E. wherein said series connected elements are coupled between said output representation and the function block in selected logical segments; and F. wherein said diagnostic program for recording which of the series connected logical elements failed to reach its predetermined state and allocating memory to save data of the event occurrence; and G. wherein the diagnostic program records the data of the event automatically, without application programming.

9. The self diagnostic function block of claim 8 wherein the second output of the function block in each selected logical segment will set a flag if the action was completed and will provide a separate indication if it was unable to complete the action, the second indication including a reference to the element that prevented the output representation from reaching its expected state.

10. The self diagnostic function block of claim 9 wherein said second output is stored in said memory and is accessible to other parts of said application program for use by alarm handlers, annunciators, displays, and other external devices coupled to the control system.

11. The self diagnostic function block of claim 10 wherein the second indication further includes means for adding character strings to identify other pertinent data to a particular operation, including reasons as to why a particular selected logical element failed.

12. The self diagnostic control system of claim 11 wherein a second input to the function block in each selected logical segment provides a means to allow the function block to trace back to another selected logical segment if a particular selected logical element is related to the other selected logical segment and failed due to other elements in that segment.

* * * * *